(12) United States Patent
Levenstein

(10) Patent No.: US 6,586,067 B2
(45) Date of Patent: Jul. 1, 2003

(54) ENCAPSULATED LENS RETROREFLECTIVE SHEETING

(75) Inventor: Seth Levenstein, Mentor, OH (US)

(73) Assignee: Avery Dennison Corporation, Pasadena, CA (US)

(*) Notice: Subject to any disclaimer, the term of this patent is extended or adjusted under 35 U.S.C. 154(b) by 44 days.

(21) Appl. No.: 09/824,347

(22) Filed: Apr. 2, 2001

(65) Prior Publication Data

US 2003/0003254 A1 Jan. 2, 2003

(51) Int. Cl.[7] ............................................. G02B 5/128
(52) U.S. Cl. ................... 428/40.1; 359/529; 359/534; 359/535; 359/536; 359/538; 359/539; 359/540; 359/541; 428/40.2; 428/40.4; 428/40.9; 428/41.3; 428/41.7; 428/41.8; 428/42.1; 428/141; 428/142; 428/143
(58) Field of Search .................. 428/40.1, 40.2, 428/40.4, 40.9, 41.3, 41.7, 41.8, 42.1, 141, 142, 143; 359/529, 534, 535, 536, 538, 539, 540, 541

(56) References Cited

U.S. PATENT DOCUMENTS

| | | | |
|---|---|---|---|
| 3,114,725 A | 12/1963 | Kaufman, Jr. | 260/32.8 |
| 3,190,178 A | 6/1965 | McKenzie | 88/82 |
| 3,305,602 A | 2/1967 | Bromstead | 260/853 |
| 4,025,159 A | 5/1977 | McGrath | 350/105 |
| 4,075,049 A | 2/1978 | Wood | 156/220 |
| 4,653,854 A | 3/1987 | Miyata | 350/105 |
| 4,897,136 A | 1/1990 | Bailey et al. | 156/145 |
| 5,064,272 A | 11/1991 | Bailey et al. | 359/541 |
| 5,066,098 A | 11/1991 | Kult et al. | 359/540 |
| 5,262,225 A * | 11/1993 | Wilson | 428/203 |
| 5,283,101 A * | 2/1994 | Li | 428/141 |
| 5,378,520 A | 1/1995 | Nagaoka et al. | 428/72 |
| 5,514,441 A | 5/1996 | Photo et al. | 428/72 |
| 5,784,198 A | 7/1998 | Nagaoka | 359/534 |
| 5,882,771 A | 3/1999 | Klein et al. | 428/161 |
| 6,054,208 A | 4/2000 | Rega et al. | 428/323 |

* cited by examiner

Primary Examiner—Nasser Ahmad
(74) Attorney, Agent, or Firm—Renner, Otto, Boisselle & Sklar, LLP

(57) ABSTRACT

Encapsulated-lens retroreflective sheeting is described which contains an improved binder layer. The binder layer is obtained from a film-forming mixture which comprises:

(A) a vinyl chloride copolymer,
(B) a thermoplastic polyurethane, and
(C) an aminoplast resin.

Such binder layer exhibits improved adhesion to metallized beads and to a variety of cover films such as acrylic films.

35 Claims, 1 Drawing Sheet

ENCAPSULATED LENS RETROREFLECTIVE SHEETING

FIELD OF THE INVENTION

This present invention relates to encapsulated-lens reflective sheeting. More particularly, the invention relates to retroreflective sheeting containing an improved binder layer composition.

BACKGROUND OF THE INVENTION

Encapsulated-lens retroreflective sheeting, also known as high intensity sheeting, is typically sold for use as traffic signs and other uses which need to be outdoor durable for a minimum of ten years. Therefore, highly durable and cost-effective materials must be used. Acrylic face films or cover films are desirable for this type of sheeting for several reasons, including their excellent durability, their receptiveness to highly durable screen printing inks, and their relatively low cost to produce.

For retroreflective performance, the sheeting also includes metallized glass microspheres which need to have an air gap above them, and the air gap is produced by encapsulation. In one embodiment, such sheeting may be prepared by the following procedure:

(1) Glass microspheres are embedded into a substrate which comprises a polyolefin such as a low-density polyethylene layer which is coated onto a polyester film. The substrate is heated to soften the polyolefin as the glass beads are brought into contact with and partially embedded into the polyolefin.

(2) The beaded polyolefin/polyester substrate is placed in a vacuum metalizer, and the surface containing the partially exposed glass beads is metallized with aluminum whereby a coating of aluminum is deposited on the exposed surface of the glass beads and the exposed surface of the polyolefin.

(3) A base sheet is prepared by coating a binder film comprising a thermoplastic polymer onto a release liner, and thereafter transferring the coated film by heat onto a support layer such as a 1 or 2-mil thick vinyl or polymethyl methacrylate layer which has been deposited on a casting substrate such as paper.

(4) The base sheet is then thermally bonded to the exposed aluminum coated surface of the glass beads by bringing the thermoplastic polymer surface into contact with the glass beads at an elevated temperature with mild pressure.

(5) The glass beads are removed from the polyolefin/polyester substrate by stripping the substrate from the base sheet. It is desired that the glass beads preferentially adhere to the thermoplastic polymer. The casting substrate (paper) may then be removed.

(6) The bead-containing base sheet with support layer is placed in contact with a preformed cover sheet, and the cover sheet is thermally laminated to the binder layer of the base sheet by embossing the laminate from the binder layer side with an embossing die having a predetermined pattern so that the embossing procedure results in the formation of a network of narrow intersecting bonds that extend between the cover sheet and the binder layer at the point of contact between the bonds and the cover sheet as the embossing pattern forces the cushion coat through the spaces between the beads and into contact with the cover sheet in selected areas. Thus, the cover sheet is thermally laminated to the cushion coat only in the bridge areas where the raised surface of an embossing die has been presses against the cushion coat and support layer. The glass beads in the bridge areas are surrounded by binder. At least a monomolecular air gap is formed between the beads and the cover sheet in the hermetically sealed areas formed by the network of intersecting bonds.

(7) An adhesive coated liner optionally can then be brought into contact with and laminated to the support layer which is beneath the binder layer.

The polymer materials which are selected for the binder film must comprise materials that are capable of retrieving the metalized glass beads from the polyolefin/polyester substrate, and materials which are also capable of firmly adhering to the cover film. These materials must also sufficiently flow when subjected to elevated temperature and pressure to perform these tasks, while at the same time they must be durable and dimensionally stable under conditions to which traffic signs may be exposed over extended periods of outdoor use.

It has been difficult to find individual thermoplastic resins for use as binder layers which are capable of both retrieving the metalized glass beads and forming permanent bonds to the cover film through heat lamination. Many resins which retrieve beads have poor adhesion to certain cover films such as acrylic films, and many resins which form permanent bonds to acrylic films through heat lamination are inefficient at retrieving beads. Some materials such as polycarbonates are capable of retrieving beads and adhering to acrylic films, but polycarbonates require a high processing temperature which is generally too high to be useful as a binder film.

Polyurethanes have been used as binder layers in retroreflective sheeting. For example, U.S. Pat. Nos. 4,897,136 (Bailey) and 5,064,272 (Bailey) disclose the use of a polyurethane resin as the binder film in encapsulated-lens retroreflective sheeting. The polyurethane binder film has a melt flow index of 750 or lower.

U.S. Pat. No. 5,882,771 (Klein et al) describes a conformable embossable enclosed lens retroreflective sheeting which contains a bead bond layer comprising an aminoplast crosslinked polymer containing urethane groups. Prior to cross linking, the polymer has a glass transition temperature of less than about 0° C.

U.S. Pat. No. 5,378,520 (Nagaoka et al) relates to supported encapsulated-lens retroreflective sheeting. Binder materials for the glass microspheres are suggested as a binder materials having low glass transition temperatures (e.g., −20° C. or lower). Thermoplastic polyurethanes are described as being especially useful as the binder material, and mixtures of polymeric materials also are suggested as useful binder materials. For example, a vinyl chloride/acetate copolymer is described as being mixed with a polyurethane polymer to provide a flexible binder material.

SUMMARY OF THE INVENTION

Encapsulated-lens retroreflective sheeting is described which contains an improved binder layer. The binder layer is obtained from a film-forming mixture which comprises:

(A) a vinyl chloride copolymer, (B) a thermoplastic polyurethane, and (C) an aminoplast resin.

Such binder layer exhibits improved adhesion to metallized beads and to a variety of cover films such as acrylic films.

DESCRIPTION OF THE PREFERRED EMBODIMENTS

Figure 1:
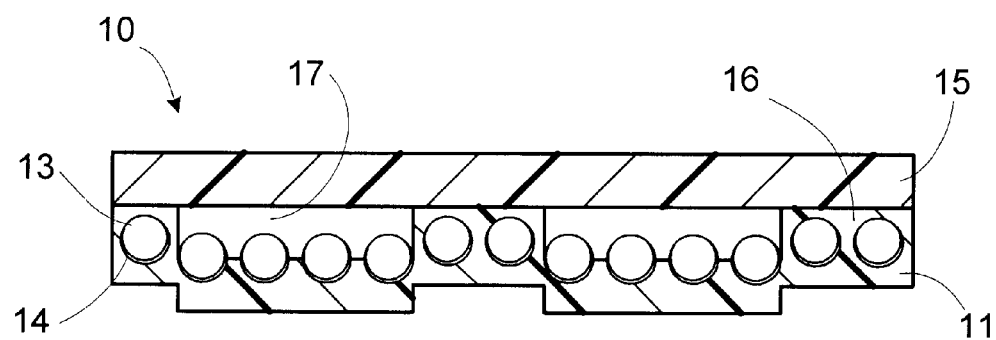
FIG. 1 is an enlarged schematic cross section through an encapsulated-lens retroreflective sheeting of the invention.

The encapsulated-lens, retroreflective sheeting of the present invention contains a binder layer which is obtained from a film-forming mixture comprising:

(A) a vinyl chloride copolymer, (B) a thermoplastic polyurethane, and (C) an aminoplast resin.

In one embodiment, the film-forming mixture comprises:

(A) from about 30 to about 80 pphr (parts per hundred parts of resin) of a vinyl chloride copolymer, (B) from about 20 to about 50 pphr of a thermoplastic polyurethane, and (C) from about 0.1 to about 30 pphr of an aminoplast resin.

In other embodiments, the film-forming mixtures may comprise from about 35 to about 78 pphr of the vinyl chloride copolymer, from 20 to about 50 pphr of the polyurethane, and from about 2 to about 15 pphr of the aminoplast resin.

The vinyl chloride copolymers which are useful in the present invention are often referred to in the art as solution grade vinyl chloride copolymers. In the broadest sense, the vinyl chloride copolymers are copolymers of vinyl chloride with at least one other vinyl comonomer. The term copolymer as used herein includes copolymers of vinyl chloride with two or more comonomers, and thus includes terpolymers. In one embodiment, the vinyl chloride copolymers are prepared by copolymerizing vinyl chloride with at least one vinyl comonomer containing at least one carboxylic acid group (—COOH) or sulfonic acid group (—SO$_3$H). Examples of such vinyl comonomers include vinyl acetate, 2-propenyl acetate, acrylic acid, methyl methacrylate, maleic acid, vinyl stearate, hydroxypropyl acrylate, glycidyl methacrylate, acrylamide, vinyl sulfonic acid, vinylidene chloride. The vinyl chloride copolymers may contain carboxylic, epoxy and/or hydroxy functional groups.

In one embodiment, the vinyl chloride copolymers comprise terpolymers of vinyl chloride, another vinyl compound such as vinyl acetate, and an unsaturated carboxylic or polycarboxylic acid or ester. Some examples of useful terpolymers include vinyl chloride/vinyl acetate/maleic acid; vinyl chloride/vinyl acetate/acrylic acid, vinyl chloride/vinyl acetate/crotonic acid, etc. Such terpolymers may contain from about 60 to about 90% by weight of vinyl chloride, from about 10 to about 25% by weight of vinyl acetate, and from 1 to about 15% of the unsaturated carboxylic or polycarboxylic acid or ester such as maleic acid, fumaric acid, or crotonic acid. The vinyl chloride copolymers and terpolymers may be obtained commercially or may be synthesized by a free radical initiated polymerization of vinyl chloride, vinyl acetate and maleic acid or maleic anhydride, fumaric acid or crotonic acid. The copolymers and terpolymers may have number average molecular weight (Mn) of from 8000 to about 50,000. In one embodiment, the Mn of the copolymers and terpolymers may range from about 15,000 to about 40,000.

A variety of solution grade vinyl copolymers are available from Union Carbide under the general designation UCAR solution vinyl resins. Specific examples of useful vinyl chloride copolymers available from Union Carbide include:

VYNS-3 which is a composition of 90% vinyl chloride and 10% vinyl acetate (Mn 44,000);

VYHH which is a composition of 86% vinyl chloride and 14% vinyl acetate (Mn 27,000);

VYHD which comprises 86% vinyl chloride and 14% vinyl acetate (Mn 22,000);

VMCH comprising 86% vinyl chloride; 13% vinyl acetate and 1% maleic acid (Mn 27,000);

VMCC which comprises 83% vinyl chloride, 16% vinyl acetate and 1% maleic acid (Mn 19,000);

VMCA which comprises 81% vinyl chloride, 17% vinyl acetate and 2% maleic acid (Mn 15,000);

VERR-40 which comprises 82% vinyl chloride, 9% epoxy-containing monomer vinyl acetate, and 9% vinyl acetate (Mn 15,000);

VAGH which comprises 90% vinyl chloride, 4% vinyl acetate and 6% vinyl alcohol (Mn 27,000);

VAGF which comprises 81% vinyl chloride, 4% vinyl acetate and 15% hydroxy alkyl acrylate (Mn 33,000);

VAGC which comprises 81% vinyl chloride, 4% vinyl acetate and 15% hydroxy alkyl acrylate (Mn 24,000);

VYNC which comprises 60% vinyl chloride, 32% vinyl acetate and 8% hydroxy alkyl acrylate (Mn 21,000); and VROH which comprises 81% vinyl chloride, 4% vinyl acetate and 15% hydroxy alkyl acrylate (Mn 15,000).

Solution grade vinyl chloride copolymers also are available from Occidental Chemical Company, and examples include: FPC 470 which comprises 70% vinyl chloride, 25% maleate ester and 5% maleic acid; FPC 413 which comprises 81% vinyl chloride, 8% vinyl acetate and 11% hydroxy propyl acrylate; and FPC 497 which comprises 85% vinyl chloride and 15% vinyl acetate.

The thermoplastic polyurethanes which are useful in the film-forming mixtures used to prepare the binder layer can be any of a variety of cross linkable polyurethanes prepared by combining one or more polyols with one or more organic polyisocyanates. As used herein, crosslinkable means that the polymer has functional groups capable of reacting with a crosslinking agent. Preferably, the polyurethane has pendant hydroxyl groups free for reaction with a crosslinking agent, although other functional groups are possible for crosslinking, such as isocyanate groups and carboxyl groups. In the method of the present invention, the functional groups are unprotected (i.e., unblocked), allowing crosslinking to occur.

A variety of polyols may be utilized in preparing the polyurethane. Also, mixtures of polyols can be used. The term "polyol" as used herein refers to polyhydric alcohols containing two or more hydroxyl groups. The polyol preferably has a hydroxyl functionality of 2–4 (i.e., diols, triols, tetraols). More preferably, the polyol is a diol, although higher functional polyols, such as triols and tetrols, can be used in combination with a diol. Most preferably, the polyol is a diol or mixture of diols and no higher functional polyols are used to prepare the polyurethane.

The polyol can be a polyether polyol such as polytetramethylene glycol and polypropylene glycol; a polyester polyol such as the reaction product of adipic acid and neopentyl glycol or phthalic anhydride and hexanediol; an acrylic polyol; etc. In one embodiment, the polyol is a hydroxyterminated polyester polyol prepared by polycondensation of an aliphatic or aromatic dicarboxylic acid and a molar excess of an aliphatic glycol.

In one embodiment, the polyol is a hydroxyl terminated polyol of the following formula: HO—[R—O—C(O)—

R'—C(O)—O—R—O—]$_n$)H, wherein R is an aliphatic group having 2–10 carbon atoms, R' is an aliphatic or aromatic group having up to 14 carbon atoms, and n is at least 2. This polyester diol is typically formed from one or more types of aliphatic or aromatic acids/esters and one or more types of aliphatic diols. For example, a polyester diol of the above formula can be prepared from an aromatic acid or ester such as isophthalic acid or dimethyl isophthalate (or mixture thereof), and a diol such as neopentyl glycol, 1,6-hexanediol, or 1,4-cyclohexane dimethanol (or mixture thereof. If both an aromatic and an aliphatic material are used, the weight percent of the aromatic material is generally less than that of the aliphatic material.

The polyester diol, or other suitable polyol, preferably has a hydroxyl equivalent weight of about 90 to about 5000, more preferably about 200 to about 3000, and most preferably about 250–2000. The polyester diol, or other suitable polyol, preferably has an acid number of no greater than about 1.0, and more preferably no greater than about 0.7. Acid number can be determined in accordance with ASTM D 4662-93.

An example of a commercially available polyester diol is FOMREZ 8056-146 from Witco Corp., Melrose Park, Ill. This resin is believed to contain neopentyl glycol at approximately 26 wt-%, 1,6-hexanediol at approximately 29 wt-%, adipic acid/ester at approximately 33 wt-%, and isophthalic acid/ester at approximately 12 wt-%. Other polyester diols are commercially available under the trade designations FOMREZ 55-112 (believed to contain approximately 47 wt-% neopentyl glycol and approximately 53% adipic acid/ester) and FOMREZ 8066-120 (believed to contain approximately 49 wt-% hexanediol, approximately 33 wt-% adipic acid/ester, and approximately 18 wt-% isophthalic acid/ester) from Witco Corp, as well as LEXOREZ from Inolex Chemical Company, Philadelphia, Pa., and RUCOFLEX from Ruco Polymer Corp., Hicksville, N.Y. It should be understood that blends or mixtures of such diols can be used in preparation of the polyurethane used in the film-forming mixture.

A variety of triols may be utilized in the preparing the polyurethane. Suitable triols include, but are not limited to, polyether triols such as polypropylene oxide triol, polyester triols other than polycaprolactone triols, and simple triols such as trimethylolpropane and glycerol, and mixtures thereof. Preferably the hydroxyl groups in the triol are primary in order to facilitate crosslinking of the resultant polymer. Examples of triols include those commercially available under the trade designations FOMREZ 1066 (trimethylolpropane, hexanediol, and adipate) from Witco Corp., TONE 0305 (a polycaprolactone triol) from Union Carbide Corp., New Milford, Conn., and RUCOFLEX F-2311 from Ruco Polymer Corp. It should be understood that these materials could be used as blends or mixtures with other polyols to achieve a Tg of less than about 0° C.

Other polyester polyols are available from Miles Industrial Chemical Division of Miles Inc., Pittsburgh, Pa. under the general designations Desmophen and Multson. For example, Desmophen 670A-80 is available as a solution in n-butyl acetate (80% solids). It is believed to be derived from a mixture comprising isophthalic acid, 1,6-hexanediol, trimethylol propane and phthalic and or phthalic acid anhydride, and is characterized as having an equivalent weight of about 500, an acid number of 2.0 maximum, and a hydroxyl number of about 104 to about 112.

Tetrafunctional or higher alcohols such as pentaerythritol may also be useful polyols. Other useful polyols are taught by E. N. Doyle in "The Development and Use of Polyurethane Products," McGraw-Hill, 1971. If a triol and higher functional polyol is used, the NCO:OH stoichiometry will need to be adjusted accordingly, although this would be understood by one of skill in the art.

A wide variety of polyisocyanates may be utilized in preparing the polyurethane. "Polyisocyanate" means any organic compound that has two or more reactive isocyanate (—NCO) groups in a single molecule that can be aliphatic, alicyclic, aromatic, or a combination thereof. This definition includes diisocyanates, triisocyanates, tetraisocyanates, and mixtures thereof. Preferably, diisocyanates are utilized. These isocyanate groups can be bonded to aromatic or cycloaliphatic groups. Most preferably aliphatic isocyanates, including cycloaliphatic isocyanates, are used to improve weathering and eliminate yellowing. Useful diisocyanates include, but are not limited to, those selected from the group consisting of bis(4-isocyanotocyclohexyl) methane ($H_{12}$ MDI, available from Bayer Corp., Pittsburgh, Pa.), diphenylmethane diisocyanate (MDI, available from Bayer Corp., Pittsburgh, Pa.), isophorone diisocyanate (IPDI, available from Huels America, Piscataway, N.J.), toluene 2,4-diisocyanate (TDI, available from Aldrich Chemical Co., Milwaukee, Wis.), hexamethylene diisocyanate (HDI, available from Aldrich Chemical Co., Milwaukee, Wis.), m-tetramethylxylene diisocyanate (TMXDI, available from Aldrich Chemical Co., Milwaukee, Wis.), and 1,3-phenylene diisocyanate. It is also noted that mixtures of diisocyanates can also be used.

The stoichiometry of the polyurethane reaction is based on a ratio of equivalents of isocyanate to equivalents of polyol. The overall preferred NCO:OH ratio for the polyurethane is less than 1:1 to allow for residual hydroxyl groups in the resultant polyurethane. More preferably, the NCO:OH ratio is about 0.8–0.99 to 1. Most preferably, the NCO:OH ratio is about 0.91–0.96 to 1. It will be understood by one of skill in the art that this ratio will vary depending upon the synthetic sequence when using triol(s) and/or tetrol(s). This is accomplished typically by varying the amount of isocyanate such that gellation is avoided and a soluble product is obtained.

A catalyst may be added to the reaction mixture of polyol(s) and polyisocyanate(s) to promote the reaction. Catalysts for reacting polyisocyanate and active hydrogen containing compounds are well known in the art. See, for example, U.S. Pat. No. 4,495,061 (Mayer et al.). Preferred catalysts include organometallic compounds and amines. The organometallic compounds may be organotin compounds such as dimethyltin dilaurate, dibutyltin dilaurate, and dibutyltin dimercaptide. The preferred catalyst is dibutyltin dilaurate. The catalyst is used in an amount effective to promote the reaction. Preferably, it is used in an amount of about 0.01–2% by weight (wt-%), based on the total weight of solids. More preferably, the catalyst is used in an amount of about 0.01–0.03 wt-% based on solids.

The polymer may be prepared in the presence or absence of a solvent. Preferably, it is prepared in the presence of one or more organic solvents. Examples of suitable solvents include, but are not limited to, amyl acetate, aromatic hydrocarbons and mixtures thereof, butanone, butoxy ethoxyethyl acetate, 2-ethoxyethyl acetate, cyclohexanone, dioxane, 4-methyl-2-pentanone, tetrahydrofuran, toluene, xylene, and/or mixtures thereof. Preferred solvents are xylene, 4-methyl-2-pentanone, and mixtures thereof. The polyurethane reaction mixture preferably includes about 30–75 wt-% total solids, and more preferably about 40–55 wt-% total solids.

An extensive description of some of the useful techniques for preparing polyurethanes can be found in J. H. Saunders and K. C. Frisch, "Polyurethanes: Chemistry and Technology," Part II, Interscience (New York 1964), pages 8–49, and in the various references cited therein. The component polyol(s) and polyisocyanate(s) may be reacted simultaneously or stepwise.

Useful thermoplastic polyurethanes are available commercially. For example, Irostic 9815 is available from Huntsman Polyurethanes and is believed to be an aromatic polyester urethane polymer. An example of an aliphatic polyurethane is Q-thane AP3429 available from K. J. Quinn and Co. Inc. which is believed to be the reaction product of 1,1-methylene bis(4-isocyanatocyclohexene adipic acid, isophthalic acid and 1,4-butene diol.

The film-forming mixtures used to form the binder layer also contain an aminoplast resin as a crosslinking agent. Aminoplast resins are nitrogen-rich polymers containing nitrogen in the amino form (—NH$_2$) and they are formed by the reaction of an aldehyde and an amine or urea. Example of aminoplast resins include urea-formaldehyde resins, melamine-formaldehyde resins, glycoluril-formaldehyde resins, benzoguanamine-formaldehyde resins etc. Although not wishing to be held to any theory, it is believed that these resins contribute to the high impact resistance of the crosslinked polyurethane and to the weatherability of the binder layer.

In one embodiment, the aminoplast resin is a melamine-formaldehyde resin selected from alkylated melamine-formaldehyde resins, imino melamine-formaldehyde resins, and mixed ether and butylated melamine-formaldehyde resins.

The partially methylated melamine-formaldehyde resins generally contain a methoxymethyl-methylol functionality such as represented by the following formula I:

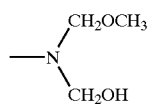

I

A series of such partially methylated melamine formaldehyde resins is available from Cytec Industries, Inc. under the trade designations CYMEL 370, 373, 380 and 385 resins. The monomer content in Cymel 370 is 40%; in Cymel 373 is 50%; and in Cymel 380 is 40%.

A series of highly methylated melamine resins containing a methoxymethyl functionality as represented by the following formula II:

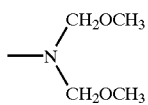

II also is available from Cytec under the general trade designations Cymel 300, 301, 303 and 350 resins. The various resins in this series differ in their degree of alkylation and in monomer content. The monomer content in Cymel 300 is about 76%; in Cymel 301, about 68%; Cymel 303, about 59%; and in Cymel 350, 68%.

Imino melamine resins contain methoxymethyl-imino functionalities such as may be represented by the following Formula III:

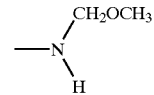

III

A series of melamine-formaldehyde resins known as high imino resins are available from Cytec under the trade designations Cymel 202, 203, 254, 324 and 3050. The monomer content in Cymel 202 is 52%; in Cymel 203 is 36%; in Cymel 254 is 46%; in Cymel 324 is 43%; and in Cymel 3050 is 38%.

Mixed ether and butylated melamine resins are available from Cytec under the general trade designations Cymel 1100 resins, and these contain an alkoxy methyl functionality as illustrated by Formula IV:

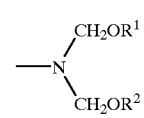

IV wherein R$^1$ and R$^2$ may be different alkyl groups such as methyl, ethyl, butyl or isobutyl groups, or both R$^1$ and R$^2$ may be butyl groups.

Specific examples of mixed ether and butylated melamine resins available from Cytec include Cymel 1116 wherein R$^1$ is methyl and R$^2$ is ethyl; Cymel 1130 where R$^1$ is methyl and R$^2$ is n-butyl; Cymel 1131 where R$^1$ is methyl and R$^2$ is n-butyl; Cymel 1133 where R$^1$ is methyl and R$^2$ is n-butyl; Cymel 1161 where R$^1$ is methyl and R$^2$ is isobutyl; and Cymel 1156 where both R$^1$ and R$^2$ are n-butyl.

Cymel 1158 resin is a melamine formaldehyde resin available from Cytec which contains butoxy-imino functionality as represented by the following Formula V:

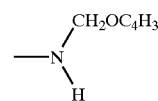

V

Benzoguanamine-formaldehyde resins also are available from Cytec, and these resins contain an alkoxymethyl functionality as illustrated by Formula VI:

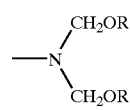

VI where each R is methyl, ethyl or n-butyl. Specific examples include Cymel 659 where each R is n-butyl; Cymel 1123 where one R is methyl and the other R is ethyl (ratio Me/Et=55/45); Cymel 1125 where one R is methyl and the other R is ethyl (ratio 55/45); and Cymel 5010, 5011 and 27-809 in which both R groups are n-butyl groups.

The aminoplast resin also may be glycoluril-formaldehyde resins which contain stable ring structures. Examples of such resins available from Cytec include Cymel 1170 (a highly butylated glycoluril resin); Cymel 1171 (a methylated-ethylated glycoluril resin); and Cymel 1172 (an unalkylated resin);

The aminoplast resins useful in the present invention may also be urea-formaldehyde resins, and these also are available from Cytec Cymel U-60, U-64, U-65 and UM-20 are methylated urea-formaldehyde resins; Cymel U-80 is a butylated urea-formaldehyde resin; Cymel U-21-510. U-21-511 and U-640 are n-butylated urea-formaldehyde resins; and Cymel U-662, U-663, U-689 and U-1047 are isobutylated urea-formaldehyde resins.

Other useful amino resins available from Cytec include Cymel 1141 and Cymel 1125 which are carboxyl modified amino resins.

The film-forming mixtures used to form the binder layer generally will contain one or more solvents which are inert to the mixture. The solvent should be sufficiently low boiling so that it will vaporize when coated onto a surface in a thin film. Preferred solvents include low boiling esters such as ethyl acetate, butyl acetate, amyl acetate, 2-ethoxyethyl acetate, 2-(2-ethoxy) ethoxyethylacetate, 2-butoxyethyl acetate and other similar esters, hydrocarbons such as toluene and xylene, ketones, such as acetone, and methyl ethyl ketone, chlorinated solvents, nitro aliphatic solvents, dioxane, etc. The amount of solvent in the film-forming mixture may be varied over a wide range such as from about 3% to about 75% by weight, more often, from about 40–75% of the solid components.

Inhibitors, antioxidants and ultraviolet absorbers or light stabilizers also may be included in the film-forming formulations. Particularly useful ultraviolet absorbers, inhibitors and antioxidants include benzotriazole derivatives, hydroxy benzophenones, esters of benzoic acids, oxalic acid, diamides, etc. Various benzotriazole derivatives useful as ultraviolet absorbers and stabilizers are described in U.S. Pat. Nos. 3,004,896; 4,315,848; 4,511,596; and 4,524,165. Those portions of these patents which describe the various benzotriazole derivatives are incorporated herein by reference. Useful ultraviolet light stabilizers, inhibitors and antioxidants are available from Ciba-Geigy Corporation under the general trade designation "Tinuvin." For example, Tinuvin 328 is described as an ultraviolet absorber which is identified as 2-(2'-hydroxy-3', 5'-di-tert-amylphenyl) benzotriazole, and Tinuvin 292 is a hindered amine light stabilizer identified as bis(1,2,2,6,6-pentamethyl-4-piperidinyl)sebacate.

Antioxidants are available from Ciba-Geigy under the general trade designation "Irganox". For example, Irganox 1010 is tetrakis [methylene (3,5-di-tert-4 hydroxycinnamate] methane. Thermolite 31 is a heat stabilizer from Elf Atochem and is believed to be dioctyl tin bis(isooctylmercaptoacetate). Cyasorb-5411 is a UV absorber available from Cytec and is believed to be 2-(2'-hydroxy-5'-octyl phenyl-)benzotriazole.

The amount of antioxidant, UV stabilizer, and/or UV absorber-including in the film-forming mixtures is an amount which is effective for the intended result. Generally, these additives may be present in film-forming mixtures in amounts of from 0 to about 10 pphr or from about 0.1 to about 5 pphr.

The film-forming mixture may also contain pigments such as titanium dioxide, aluminum oxide, mica, talc, silica, etc. to provide color when desired. The amount of pigments may range from about 0 to 100 pphr and more often is from about 5 to about 50 or 75 pphr.

In one embodiment of the invention, the encapsulated-lens retroreflective sheeting comprises:
(A) a binder layer which is obtained from a film-forming mixture comprising:
(A-1) a vinyl chloride copolymer,
(A-2) a thermoplastic polyurethane, and
(A-3) an aminoplast resin,
(B) a monolayer of lenses which is partially embedded in the binding layer,
(C) a reflective layer underlying the lenses, and
(D) a cover film overlying and sealed to the binding layer along a network of interconnecting lines forming sealed cells within which the lenses are encapsulated and have an air interface.

In other embodiments, the sheeting described above may also comprise:
(E) a support layer underlying the binder layer, and, optionally,
(F) a pressure sensitive adhesive layer underlying the support layer, and, optionally,
(G) a release layer underlying the adhesive layer.

Figure 2:
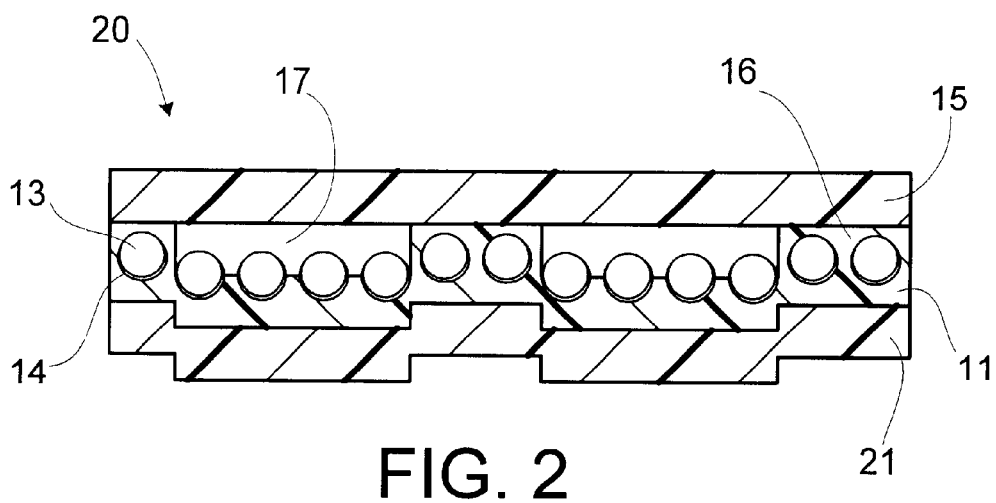
FIG. 2 is an enlarged schematic cross section through another encapsulated-lens retroreflective sheeting of the invention.
Figure 3:
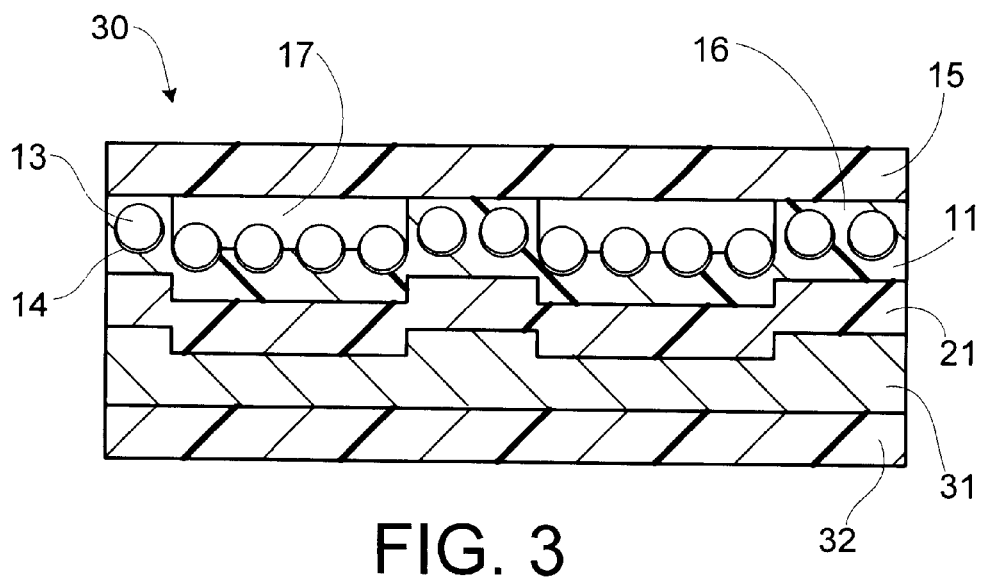
FIG. 3 is an enlarged schematic cross section through another encapsulated-lens retroreflective sheeting of the invention.

These embodiments of the retroreflective sheeting of the present invention are illustrated in FIGS. 1, 2 and 3 wherein like numbers are used to refer to identical elements. Thus, the retroreflective sheeting 10 shown in FIG. 1, the retroreflective sheeting 20 shown in FIG. 2 and the retroreflective sheeting 30 shown in FIG. 3 comprise a binder layer 11 having a monolayer of retroreflective glass microspheres 13 having a partial metallized layer 14, and the microspheres are partially embedded in the exposed surface of the binder layer 11; a cover sheet or film 15 disposed in space relation in front of the layer of the retroreflective glass microspheres 13 and thermally laminated to the binder layer 11 only in the extruded bridge areas 16 which form a network of intersecting bonds between the binder layer 11 and the cover sheet 15 at the points of contact 16 forming an air space or interface 17.

In FIG. 2, a support layer 21 underlies and is in contact with the binder layer 11. In FIG. 3, adhesive layer 31 underlies and is in contact with the support layer 21, and a release coated liner 32 underlies and is in contact with adhesive layer 31.

In another embodiment, the encapsulated-lens retroreflective sheeting of the invention comprises:
(A) a base sheet that comprises a monolayer of retroreflective lenses partially embedded in a binder layer;
(B) a cover sheet disposed in spaced relationship from and overlying the layer of retroreflective lenses; and
(C) a network of intersecting bonds that extend between said cover sheet and said base sheet and comprise binder material thermo-formed at the point of contact between said bonds and said cover sheet to form a plurality of cells within which retroreflective lenses are hermetically sealed and to adhere the base sheet to the cover sheet, wherein the binder layer comprises a polymer obtained from a film-forming mixture comprising:
(1) a vinyl chloride copolymer,
(2) a thermoplastic polyurethane, and
(3) an aminoplast resin.

In other embodiments, the above sheeting may also comprise a support layer underlying the base sheet, and, optionally, (F) a pressure sensitive adhesive layer underlying the support layer, and, optionally, (G) a release layer underlining the adhesive layer.

The transparent microsphere lenses 13 utilized in the retroreflective sheeting of the present invention may be characterized as having average diameters in a range of from about 30 to about 120 microns, and more often in a range from about 40 to about 80 microns. The index of refraction of the microsphere lenses is generally in the range of from about 1.8 to about 2.0, more typically is in the range of from about 1.90 to about 1.95, and most often between about 1.92 to about 1.93. Glass microspheres are typically used although ceramic microspheres such as those made by sol/gel techniques can also be used.

The cover sheet 15 in FIGS. 1–3 generally may be a single layer or multiple layers, and may comprise various thermoplastic polymers including acrylic polymer such as polymethylmethacrylate; vinyl polymers such as PVC and vinyl acrylic copolymers, or polyurethanes such as aliphatic polyether urethanes. The cover sheet is prepared prior to conversion into an encapsulated bead retroreflective product by extruding the polymer of the cover sheet onto a polymer coated paper casting sheet or onto a polymer casting sheet. Casting sheet products are well known to the industry and supplied by companies such as Felix Schoeller Technical Papers, Pulaski, N.Y., S. D. Warren of Newton Center, Mass. and Ivex Corporation of Troy, Ohio.

The support layer or film 21 in FIGS. 2 and 3 may be any one of a number of polymeric materials such as extruded acrylic films, cast vinyl films, calendared vinyl films and polyurethane films. In one embodiment, the material used in the support layer is an acrylic film. A support layer is not a product requirement, but the layer is often included in the retroreflective sheetings to provide support to the structures 20 and 30 illustrated in FIGS. 2 and 3 particularly during processing and manufacture.

Adhesive layer 31 in FIG. 3 is often included in the sheeting of the invention in addition to those layer discussed above. For example, an adhesive layer 31 can be applied to the support layer 21 to serve a functional purpose such as subsequently adhering the sheeting to a substrate. Conventional pressure sensitive adhesives such as acrylic-based adhesives or heat- or solvent-activated adhesives are typically used and may be applied by conventional procedures. For example, a preformed layer of adhesive on a carrier web or release liner 32 can be laminated to the support layer 21 as illustrated in FIG. 3. Conventional release liners 32 can be utilized in the formation of the retroreflective sheeting of the present invention.

The encapsulated-lens retroreflective sheeting of the present invention can be made by procedures normally used in the industry. U.S. patents describing encapsulated-lens retroreflective sheeting include U.S. Pat. Nos. 3,190,178, 4,025,159 and 6,054,208, and the disclosures of these patents with regard to the process for preparing the encapsulated-lens retroreflective sheeting is hereby incorporated by reference.

In one embodiment, the encapsulated-lens retroreflective sheeting of the present invention may be prepared by a general procedure which may be described as follows:

(1) Glass microspheres are embedded into a substrate which comprises a polyolefin such as a low-density polyethylene layer which is coated onto a polyester film. The substrate is heated to soften the polyolefin as the glass beads are brought into contact with and partially embedded into the polyolefin.

(2) The beaded polyolefin/polyester substrate is placed in a vacuum metalizer, and the surface containing the partially exposed glass beads is metallized with aluminum whereby a coating of aluminum is deposited on the exposed surface of the glass beads and the exposed surface of the polyolefin.

(3) A base sheet is prepared by coating a binder film comprising a thermoplastic polymer onto a release liner, and thereafter transferring the coated film by heat onto a support layer such as a 1 or 2-mil thick vinyl or polymethyl methacrylate layer which has been deposited on a casting substrate such as paper.

(4) The base sheet is then thermally bonded to the exposed aluminum coated surface of the glass beads by bringing the thermoplastic polymer surface into contact with the glass beads at an elevated temperature with mild pressure.

(5) The glass beads are removed from the polyolefin/polyester substrate by stripping the substrate from the base sheet. It is desired that the glass beads preferentially adhere to the thermoplastic polymer. The casting substrate (paper) may then be removed.

(6) The bead-containing base sheet with support layer is placed in contact with a preformed cover sheet, and the cover sheet is thermally laminated to the binder layer of the base sheet by embossing the laminate from the binder layer side with an embossing die having a predetermined pattern so that the embossing procedure results in the formation of a network of narrow intersecting bonds that extend between the cover sheet and the binder layer at the point of contact between the bonds and the cover sheet as the embossing pattern forces the cushion coat through the spaces between the beads and into contact with the cover sheet in selected areas. Thus, the cover sheet is thermally laminated to the cushion coat only in the bridge areas where the raised surface of an embossing die has been presses against the cushion coat and support layer. The glass beads in the bridge areas are surrounded by binder. At least a monomolecular air gap is formed between the beads and the cover sheet in the hermetically sealed areas formed by the network of intersecting bonds.

(7) An adhesive coated liner optionally can then be brought into contact with and laminated to the support layer which is beneath the binder layer.

The retroreflective sheeting of the present invention generally is useful for imparting retroreflectivity in various applications such as license plates, traffic signs, pavement markings, construction zone markings, etc. More particularly, the retroreflective sheeting of the present invention can be used in applications such as highway signs, including contoured signs, commercial signs, fleet markings and fleet graphics, building graphics, temporary and permanent traffic control devices, signs and printed decals. Other applications of the sheetings of the present invention include vehicle markings, computer cut graphics, die cut graphics, pin-stripping for vehicles, boats etc., decorating applications on various articles such as notebooks, boat tags, back packs, boats, cars, etc.

The following examples A to D illustrate the preparation of the retroreflective sheeting of the invention. Examples Control 1 and Control 2 illustrate the preparation and properties of examples of sheeting which do not contain the binder layer specified herein. Unless otherwise indicated in the examples and elsewhere in the specification and claims, all parts and percentages are by weight, temperatures are in degrees celsius, and pressure is at or near atmospheric pressure.

EXAMPLE CONTROL-1

Glass microspheres with a refractive index of 1.93 were flooded onto a polyethylene-PET carrier which was heated to about 90° C. A monolayer of beads affixed to the softened polyethylene surface, while excess beads fell off of the carrier. The web was then post-heated to approximately 115° C. to further soften the polyethylene and draw the beads deeper into it.

In a vacuum chamber, aluminum was deposited over the exposed portion of the monolayer of glass beads.

Onto a 90 pound siliconized release liner was cast from solvent a binder layer at approximately 2-mil dry thickness blended from the following.

| | |
|---|---|
| Solution Vinyl Resin: VMCH | 77.2 pphr |
| Polyurethane Resin: Irostic 9815-03 | 22.8 pphr |
| Melamine-formaldehyde resin: Cymel 303 | 0 pphr |
| Pigment: TiO$_2$ | 25 pphr |
| Anti-oxidant: Irganox 1010 | 0.26 pphr |
| Heat Stabilizer: Thermolite 31 | 2.3 pphr |
| UV Absorber: Cyasorb 5411 | 4.5 pphr |
| Solvent: MEK or Toluene | 40–75% of solid components |

The dried binder layer was then heat laminated at 115° C. and at approximately 60 psi and 20 FPM to a 2-mil thick acrylic sheet support layer which had been extruded onto a PET carrier. The 90 pound siliconized liner was then removed.

The monolayer of metalized glass beads was contacted by the binder layer on support layer-PET carrier at 115° C. and approximately 60 psi and 10 FPM. While still warm, the polyethylene-PET was stripped away leaving the beads behind in the binder layer with the non-metalized side exposed. After cooling, the PET carrier was removed from behind the support layer.

A transparent acrylic cover film was adhered to the bead bearing surface of the binder layer along a network of interconnecting lines forming sealed cells within which the lenses are encapsulated and have an air interface. This sealing was done with a heated embossing roller whose surface temperature was 145° C. at a speed of 13 FPM and 60 psi setting for nip pressure.

The seal strength of the sample was sufficient to prevent the separation of the cover film from the binder layer. Attempts to break the support-binder layer away from the cover film ceased upon reaching a cell wall. Sawing through the binder bridge by placing a razor knife between the cover film and binder-support layer was extremely difficult and the usual result was for the knife to exit the sample either by cutting up through the cover film or down through the support layer.

The sample's coefficient of reflectivity measured at an observation angle of 0.2° and entrance angle of −4° in accordance with ASTM E-810 was 296. The whiteness of the film by a Cap Y colormetric reading in accordance with ASTM E309, E1347 and E1349 was 27.9.

After 2200 hours of exposure in a Carbon Arc weather-o-meter in accordance with ASTM G23, method 1, Type E the sample retained 74% of its' initial coefficient of retroreflection and had a Cap Y of 27.6. Microscopic inspection of the weathered sample revealed black spots on the beads upper surface. These spots are believed to be residue from degraded binder layer and are attributable to a large portion of the reflectivity drop.

EXAMPLE A

Encapsulated lense retroreflective sheeting was made in the same manner as described in Example Control-1 except that the binder layer included an aminoplast resin and was formed by the following blend.

| | |
|---|---|
| Solution Vinyl Resin: VMCH | 70 pphr |
| Polyurethane Resin: Irostic 9815-03 | 20 pphr |

-continued

| | |
|---|---|
| Melamine-formaldehyde resin: Cymel 303 | 10 pphr |
| Pigment: TiO$_2$ | 25 pphr |
| Anti-oxidant: Irganox 1010 | 0.26 pphr |
| Heat Stabilizer: Thermolite 31 | 2.3 pphr |
| UV Absorber: Cyasorb 5411 | 4.5 pphr |
| Solvent: MEK or Toluene | 40–75% of solid components |

The seal strength of this sample was similar to that in Example Control-1.

The sample's coefficient of reflectivity measured at an observation angle of 0.2° and entrance angle of −4° in accordance with ASTM E-810 was 315. The whiteness of the film by a Cap Y colormetric reading in accordance with ASTM E309, E1347 and E1349 was 28.7.

After 2200 hours of exposure in a Carbon Arc weather-o-meter in accordance with ASTM G23, method 1, Type E the sample retained 95% of its' initial coefficient of retroreflection and had a Cap Y of 28.7. Microscopic inspection of the weathered sample revealed very few black spots on the beads upper surface. The improved bead appearance corresponds to the improved reflectivity retention.

EXAMPLE B

Encapsulated lense retroreflective sheeting was made in the same manner as described in Example Control-1 except that the binder layer included an aminoplast resin and was formed by the following blend.

| | |
|---|---|
| Solution Vinyl Resin: VAGC | 57.5 pphr |
| Polyurethane Resin: Irostic 9815-03 | 32.5 pphr |
| Melamine-formaldehyde resin: Cymel 327 | 10 pphr |
| Pigment: TiO$_2$ | 9 pphr |
| Anti-oxidant: Irganox 1010 | 0.26 pphr |
| Solvent: MEK or Toluene | 40–75% of solid components |

The sample's coefficient of reflectivity measured at an observation angle of 0.2° and entrance angle of −4° in accordance with ASTM E-810 was 290. The whiteness of the film by a Cap Y colormetric reading in accordance with ASTM E309, E1347 and E1349 was 26.7.

After 2200 hours of exposure in a Carbon Arc weather-o-meter in accordance with ASTM G23, method 1, Type E the sample retained 100% of its' initial coefficient of retroreflection and had a Cap Y of 26.0. Microscopic inspection of the weathered sample revealed very few black spots on the beads upper surface. The improved bead appearance corresponds to the improved reflectivity retention.

EXAMPLE CONTROL-2

Encapsulated lense retroreflective sheeting was made in the same manner as described in Example Control-1 except that the binder layer was formed by the following blend.

| | |
|---|---|
| Solution Vinyl Resin: VAGC | 75 pphr |
| Polyurethane Resin: Irostic 9815-03 | 25 pphr |
| Melamine-formaldehyde resin: Cymel 303 | 0 pphr |
| Pigment: TiO$_2$ | 7 pphr |
| Anti-oxidant: Irganox 1010 | 0.26 pphr |
| Solvent: MEK or Toluene | 40–75% of solid components |

The sample's coefficient of reflectivity measured at an observation angle of 0.2° and entrance angle of −4° in accordance with ASTM E-810 was 267.

After 1050 hours of exposure in a Carbon Arc weather-o-meter in accordance with ASTM G23, method 1, Type E the sample retained 28% of its' initial coefficient of retroreflection. Visual comparison of this sample to an unweathered control showed that the binder layer had severely yellowed. Microscopic inspection of the weathered sample also revealed a heavy concentration of black spots on the beads upper surface which corresponds to the enormous drop in reflective performance.

EXAMPLE C

Encapsulated lense retroreflective sheeting was made in the same manner as described in Example Control-1 except that the binder layer included an aminoplast resin and was formed by the following blend.

| | |
|---|---|
| Solution Vinyl Resin: VAGC | 70 pphr |
| Polyurethane Resin: Irostic 9815-03 | 20 pphr |
| Melamine-formaldehyde resin: Cymel 1170 | 10 pphr |
| Pigment: TiO$_2$ | 25 pphr |
| Anti-oxidant: Irganox 1010 | 0.26 pphr |
| Heat Stabilizer: Thermolite 31 | 2.3 pphr |
| UV Absorber: Cyasorb 5411 | 4.5 pphr |
| Solvent: MEK or Toluene | 40–75% of solid components |

The seal strength of this sample was similar to that in Example Control-1.

The sample's coefficient of reflectivity measured at an observation angle of 0.2° and entrance angle of −4° in accordance with ASTM E-810 was 308. The whiteness of the film by a Cap Y colormetric reading in accordance with ASTM E309, E1347 and E1349 was 29.1.

EXAMPLE D

Encapsulated lense retroreflective sheeting was made in the same manner as described in Example A except that the binder layer included an aminoplast resin and was formed by the following blend.

| | |
|---|---|
| Solution Vinyl Resin: VROH | 40 pphr |
| Polyurethane Resin: Irostic 9815-03 | 40 pphr |
| Melamine-formaldehyde resin: Cymel 327 | 20 pphr |
| Pigment: TiO$_2$ | 9 pphr |
| Anti-oxidant: Irganox 1010 | 0.26 pphr |

The components of the film-forming solutions of Examples Control-1–2 and A–D can be mixed in any order. In one embodiment the polyurethane resin is dissolved in the solvent to form a first solution. A second solution is prepared by dissolving all of the other components in the remainder of the solvent. The two solutions are then mixed together to form the desired mixture.

The retroreflective sheeting of the invention exhibits good adhesion of the binder layer to the metalized glass beads and to the cover sheet. In addition, the sheeting of the invention is characterized as having good durability and stability when exposed to outdoor conditions, as demonstrated by the high retention of the sheeting's initial coefficient of reflection after over 1000 or 2000 hours of exposure in carbon are weather-o-meter in accordance under ASTM E309, E1347 and 1349 which simulates years of outdoor usage.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. Encapsulated-lens, retroreflective sheeting comprising a binder layer which is obtained from a film-forming mixture comprising:
   (A) a vinyl chloride copolymer,
   (B) a thermoplastic polyurethane, and
   (C) an aminoplast resin.

2. The sheeting of claim 1 wherein the vinyl chloride copolymer (A) comprises a copolymer of vinyl chloride and at least one other vinyl comonomer.

3. The sheeting of claim 1 wherein the vinyl chloride copolymer comprises at least about 60% by weight of vinyl chloride.

4. Encapsulated-lens, retroreflective sheeting comprising a binder layer which is obtained from a film-forming mixture comprising:
   (A) a vinyl chloride copolymer comprising a terpolymer of vinyl chloride and at least two other vinyl comonomers,
   (B) a thermoplastic polyurethane, and
   (C) an aminoplast resin.

5. The sheeting of claim 4, wherein the vinyl chloride copolymer comprises a vinyl chloride, vinyl acetate, and an unsaturated carboxylic or polycarboxylic acid, or ester thereof.

6. The sheeting of claim 5 wherein the unsaturated carboxylic or polycarboxylic acid or ester is selected from maleic acid, acrylic acids, and their esters.

7. The sheeting of claim 1 wherein the thermoplastic polyurethane (B) is an aromatic polyurethane.

8. The sheeting of claim 1 wherein the aminoplast resin (C) is selected from urea-formaldehyde resins, melamine-formaldehyde resins, benzoguanamine-formaldehyde resins, and glycoluril-formaldehyde resins.

9. The sheeting of claim 8 wherein the aminoplast resin (C) is a melamine-formaldehyde resin selected from alkylated melamine-formaldehyde resins, imino melamine-formaldehyde resins, and mixed ether and butylated melamine-formaldehyde resins.

10. The sheeting of claim 1 wherein the film-forming mixture comprises:
    (A) from about 30 to about 80 pphr of a vinyl chloride copolymer;
    (B) from about 20 to about 50 pphr of a thermoplastic polyurethane, and
    (C) from about 1 to about 30 pphr of an aminoplast resin.

11. An encapsulated-lens retroreflective sheeting comprising:
    (A) a binder layer which is obtained from a film-forming mixture comprising:
        (A-1) a vinyl chloride copolymer,
        (A-2) a thermoplastic polyurethane, and
        (A-3) an aminoplast resin,
    (B) a monolayer of lenses which is partially embedded in the binding layer,
    (C) a reflective layer underlying the lenses, and
    (D) a cover film overlying and sealed to the binding layer along a network of interconnecting lines forming sealed cells within which the lenses are encapsulated and have an air interface.

12. The sheeting of claim 11 wherein the vinyl chloride copolymer (A-1) comprises a copolymer of vinyl chloride and at least one other vinyl comonomer.

13. The sheeting of claim 11 wherein the vinyl chloride copolymer comprises at least about 60% by weight of vinyl chloride.

14. An encapsulated-lens retroreflective sheeting comprising:
(A) a binder layer which is obtained from a film-forming mixture comprising:
(A-1) a vinyl chloride copolymer comprising a terpolymer of a vinyl chloride, another vinyl compound, and an unsaturated carboxylic or polycarboxylic acid or ester,
(A-2) a thermoplastic polyurethane, and
(A-3) an aminoplast resin,
(B) a monolayer of lenses which is partially embedded in the binding layer,
(C) a reflective layer underlying the lenses, and
(D) a cover film overlying and sealed to the binding layer along a network of interconnecting lines forming sealed cells within which the lenses are encapsulated and have an air interface.

15. The sheeting of claim 14 wherein the terpolymer is prepared from a mixture of vinyl chloride, vinyl acetate, and an unsaturated carboxylic or polycarboxylic acid or ester.

16. The terpolymer of claim 15 wherein the unsaturated carboxylic or polycarboxylic acid or ester is selected from maleic acid or esters thereof and acrylic acids or esters thereof.

17. The sheeting of claim 11 wherein the thermoplastic polyurethane is an aromatic polyurethane.

18. The sheeting of claim 11 wherein the aminoplast resin (A-3) is selected from urea-formaldehyde resins, melamine-formaldehyde resins, benzoguanamine-formaldehyde resins, and glycoluril-formaldehyde resins.

19. The sheeting of claim 11 wherein the aminoplast resins (A-3) is a melamine-formaldehyde resin selected from alkylated melamine-formaldehyde resins, imino melamine-formaldehyde resins, and mixed ether and butylated melamine-formaldehyde resins.

20. The sheeting of claim 11 wherein the binder layer is obtained from a film-forming mixture comprising:
(A-1) from about 30 to about 80 pphr of the vinyl chloride copolymer,
(A-2) from about 20 to about 50 pphr of the thermoplastic polyurethane, and
(A-3) from about 1 to about 30 pphr of an aminoplast resin.

21. The sheeting of claim 11 wherein the lenses are glass microspheres.

22. The sheeting of claim 11 wherein the cover film comprises a polymer selected from acrylic polymers and thermoplastic urethane polymers.

23. The sheeting of claim 11 also comprising (E) a support layer underlying the binder layer.

24. The sheeting of claim 23 also comprising:
(F) a pressure sensitive adhesive layer underlying the support layer, and, optionally,
(G) a release layer underlying the adhesive layer.

25. An encapsulated-lens retroreflective sheeting comprising:
(A) a base sheet that comprises a monolayer of retroreflective lenses partially embedded in a binder layer;
(B) a cover sheet disposed in spaced relationship from and overlying the layer of retroreflective lenses; and
(C) a network of intersecting bonds that extend between said cover sheet and said base sheet and comprise binder material thermo-formed at the point of contact between said bonds and said cover sheet to form a plurality of cells within which retroreflective lenses are hermetically sealed and to adhere the base sheet to the cover sheet, wherein the binder layer comprises a polymer obtained from a film-forming mixture comprising:
(1) a vinyl chloride copolymer,
(2) a thermoplastic polyurethane, and
(3) an aminoplast resin.

26. An encapsulated-lens retroreflective sheeting comprising:
(A) a base sheet that comprises a monolayer of retroreflective lenses partially embedded in a binder layer;
(B) a cover sheet disposed in spaced relationship from and overlying the layer of retroreflective lenses; and
(C) a network of intersecting bonds that extend between said cover sheet and said base sheet and comprise binder material thermo-formed at the point of contact between said bonds and said cover sheet to form a plurality of cells within which retroreflective lenses are hermetically sealed and to adhere the base sheet to the cover sheet, wherein the binder layer comprises a polymer obtained from a film-forming mixture comprising:
(1) a vinyl chloride copolymer comprising a terpolymer of vinyl chloride, vinyl acetate, and an unsaturated carboxylic or polycarboxylic acid, or ester thereof,
(2) a thermoplastic polyurethane, and
(3) an aminoplast resin.

27. The sheeting of claim 25 wherein the vinyl chloride copolymer comprises at least about 60% by weight of vinyl chloride.

28. The sheeting of claim 26 wherein the unsaturated carboxylic or polycarboxylic acid or ester is selected from maleic acid, acrylic acids, and their esters.

29. The sheeting of claim 25 wherein the thermoplastic polyurethane is an aromatic polyurethane.

30. The sheeting of claim 25 wherein the aminoplast resin is selected from urea-formaldehyde resins, melamine-formaldehyde resins, benzoguanamine-formaldehyde resins, and glycoluril-formaldehyde resins.

31. The sheeting of claim 25 wherein the aminoplast resin is a melamine-formaldehyde resin selected from alkylated melamine-formaldehyde resins, imino melamine-formaldehyde resins, and mixed ether and butylated melamine-formaldehyde resins.

32. The sheeting of claim 25 wherein the film-forming mixture comprises:
(1) from about 30 to about 80 pphr of a vinyl chloride copolymer;
(2) from about 20 to about 50 pphr of a thermoplastic polyurethane, and
(3) from about 1 to about 30 pphr of an aminoplast resin.

33. The sheeting of claim 25 wherein the lenses are glass microspheres.

34. The sheeting of claim 25 also comprising (D) a support layer underlying the base sheet.

35. The sheeting of claim 34 also comprising:
(E) a pressure sensitive adhesive layer underlying the support layer (D), and, optionally,
(F) a release layer underlying the adhesive layer.

* * * * *